United States Patent [19]

Herbert et al.

[11] 4,142,822

[45] Mar. 6, 1979

[54] PANEMONE WINDMILL

[76] Inventors: Frank P. Herbert, 2145 Ivy St., Port Townsend, Wash. 98366; John Ottenheimer, P.O. Box 1378, Lopez Island, Wash. 98261

[21] Appl. No.: 793,926

[22] Filed: May 5, 1977

[51] Int. Cl.² .............................................. F03D 3/04
[52] U.S. Cl. ......................................... 415/2; 290/55; 416/23; 416/41
[58] Field of Search ........................................ 415/2–4; 416/23, 41, 50, 91, 119; 290/54, 55

[56] References Cited

U.S. PATENT DOCUMENTS

| 2,892,502 | 6/1959 | Donovan | 416/23 |
|---|---|---|---|
| 3,986,785 | 10/1976 | Ferencz | 415/2 |
| 4,012,163 | 3/1977 | Baumgartner | 415/2 |
| 4,047,834 | 9/1977 | Magoveny et al. | 416/119 |

FOREIGN PATENT DOCUMENTS

| 32996 | 3/1924 | Denmark | 415/4 |
|---|---|---|---|
| 860930 | 7/1949 | Fed. Rep. of Germany | 416/119 |
| 892130 | 7/1949 | Fed. Rep. of Germany | 416/119 |
| 2307145 | 11/1976 | France | 416/119 |
| 169733 of | 1921 | United Kingdom | 415/2 |
| 403889 | 1/1934 | United Kingdom | 416/119 |

*Primary Examiner*—C. J. Husar
*Attorney, Agent, or Firm*—Seed, Berry, Vernon & Baynham

[57] ABSTRACT

A windmill with a vertical-axis rotor having thrust vanes which is surrounded by a stationary cage having guide vanes to channel the windstream to the rotor. In the preferred embodiment the rotor is a flow-through type with airfoil vanes.

7 Claims, 9 Drawing Figures

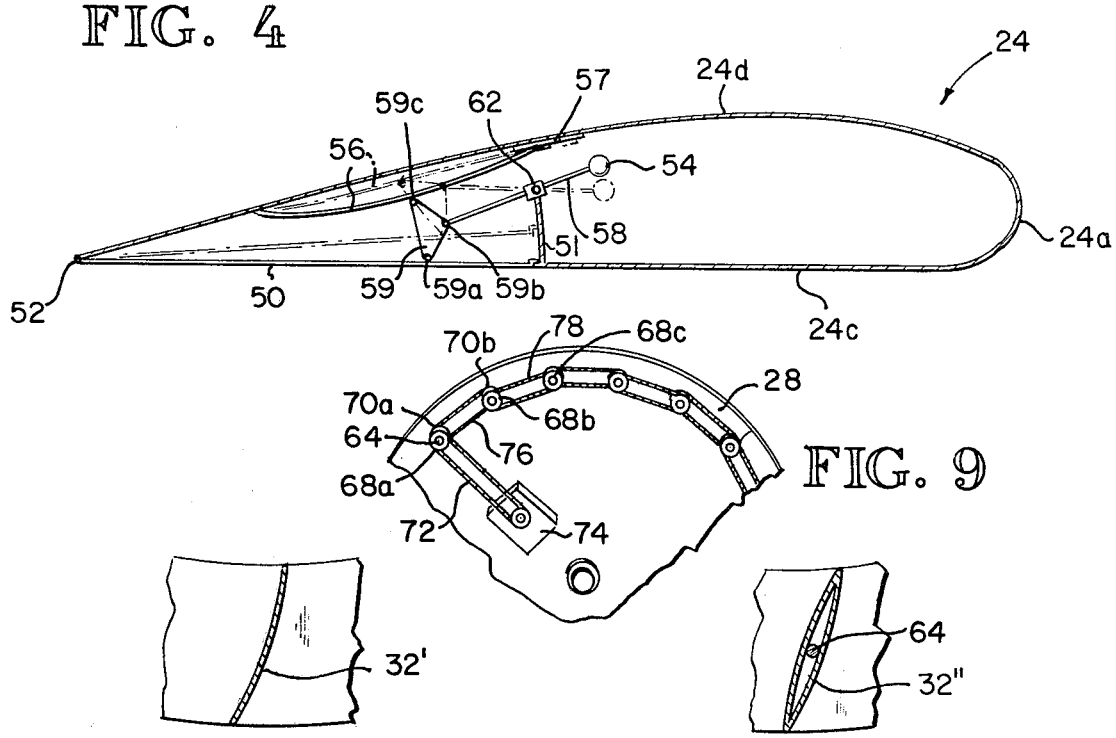
FIG. 4
FIG. 9
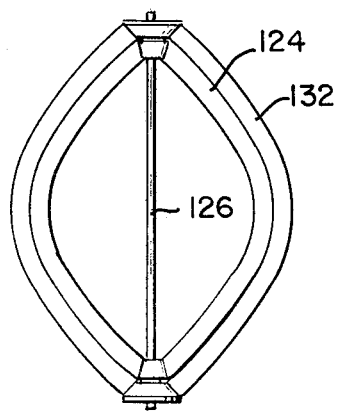
FIG. 5
FIG. 7
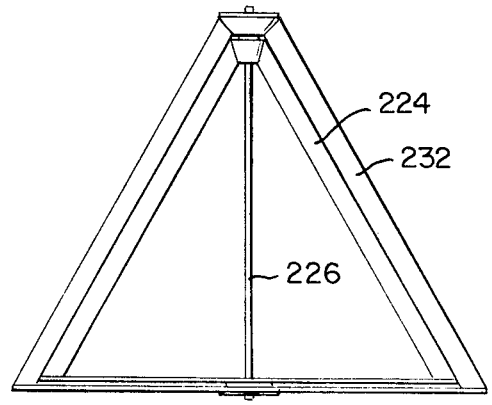
FIG. 6
FIG. 8

PANEMONE WINDMILL

BACKGROUND OF THE INVENTION

1. Field of the Invention

The present invention relates to wind machines of the panemone type and namely, a vertical axis wind collector capable of reacting to horizontal winds from any direction.

2. Description of the Prior Art

Propeller type windmills of large capacity and relatively high speed capability have either required massive towers to resist the horizontal thrust, or incorporation of a braking device to stop the windmill or a vane feathering device to reduce its effectiveness during strong wind conditions.

A large propeller turning at high speed generates a substantial gyroscopic force which will resist the directional changes required by shifts in wind direction. It is well known by those who now harness wind energy that a frequent condition involves a wind of about twenty knots speed blowing from a relatively narrow compass vector, but accompanied by recurrent gusts at considerably higher speeds which strike the windmill at a significantly different angle. As a result the supporting tower may be subjected to a dangerously severe twising action.

It has been recognized that vertical-axis rotors have the major advantage over horizontal-axis rotors that they do not have to be turned into the wind as the direction of the windstream varies. A review of prior art panemones is given on pages 22–25 of "Wind Machines" published by the U.S. Government Printing Office in 1976 (0-204-143) for the National Science Foundation (NSF-RA-N-75-051). As indicated in that publication, various types of vertical-axis panemones have been developed in the past that use drag forces to turn rotors of different shapes. These include those panemones that use plates, cups, or turbines as the drag device, and the Savonius S-shaped cross-section rotors which provide some lift force but are still predominantly drag devices. Such devices have relatively high starting torques, compared to lift devices, but relatively low tip-to-wind speeds and low power outputs per given rotor size, weight and cost.

The aforesaid publication also indicates that in the past few years attention has been directed to the Darrieus-type rotor invented in the 1920's by G. J. M. Darrieus of France. Those rotors are characterized by curved blades with airfoil cross sections, and are said to have relatively low starting torques, but relatively high power outputs per given rotor weight and cost.

SUMMARY OF THE INVENTION

The present invention aims to provide a further improved vertical-axis panemone having the advantages of the Darrieus-type, but also having better starting torque.

A further object is to provide an improved panemone which performs well in a wide range of sizes and can withstand high wind conditions.

The invention also aims to provide an improved airfoil vane for a panemone resulting in a decreased turbulence effect.

Another object is to provide a panemone on which maintenance can be safely performed under windy conditions.

In carrying out these objectives, there is provided a vertical-axis rotor having thrust vanes which is surrounded by a stationary cage having guide vanes which efficiently channel the windstream to the rotor vanes and increase wind velocity at the point of thrust on the rotor vanes. The rotor is preferably a flow-through type with airfoil vanes which have flaps on the trailing side that automatically open in the forward direction and thereby provide a step on the trailing side resulting in less turbulence in the rotor.

BRIEF DESCRIPTION OF THE FIGURES OF THE DRAWINGS

FIG. 4 is a horizontal sectional view illustrating the flap control mechanism in the rotor vanes;

FIGS. 5 and 6 show modified guide vane cross sections;

FIGS. 7 and 8 are elevational views of modified guide and rotor vane configurations; and FIG. 9 is a fragmentary top plan view showing a guide vane adjusting system.

DETAILED DESCRIPTION OF THE PREFERRED EMBODIMENTS

Figure 1:
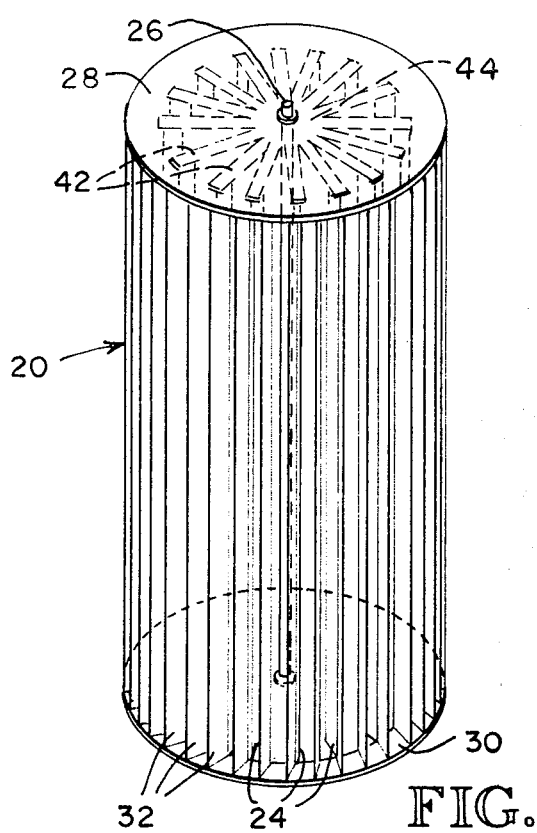
FIG. 1 is a perspective view of a panemone embodying the invention.

Referring to the drawings it is seen that the panemone of the present invention comprises a fixed cage 20 in which a rotor 22 with wind driven thrust vanes 24 and a vertical center shaft 26 is journal-mounted. The cage 20 has top and bottom end plates 28, 30 between which a plurality of vertical guide vanes 32 extend for directing air flow to the rotor vanes 24. Suitable bearings are provided in the center of the end plates 28, 30 for the rotor shaft 26.

The guide vanes 32 are equidistant radially from the rotor axis and are equally spaced circumferentially of the rotor axis at both their inner and outer longitudinal edges 32a, 32b, respectively. As a consequence the flow path 36 between adjoining guide vanes narrows inwardly toward the circumferential travel path of the rotor vanes 24. It is preferred to horizontally tilt the guide vanes so that the radii 38a from the rotor axis to the inner edges 32a are advanced by a lead angle 40 in the direction of rotation of the rotor 12 from the respective radii 38b to the outer edges 32b of the guide vanes. As a consequence the air inflow between the guide vanes to the rotor is given a vortex effect in the direction of rotation of the rotor.

The rotor vanes 24 preferably have a high-lift airfoil section defined by its lift face 24c and opposite face 24d to provide a generally tangential thrust responsive to air flow through the rotor. At their ends the rotor vanes are connected to the shaft 26 as by spokes 42 radiating from top and bottom hubs 44. In the broad sense each vane 24 and its respective upper and lower spokes 42 may be collectively considered to be a generally U-shaped rotor vane.

Figure 3:
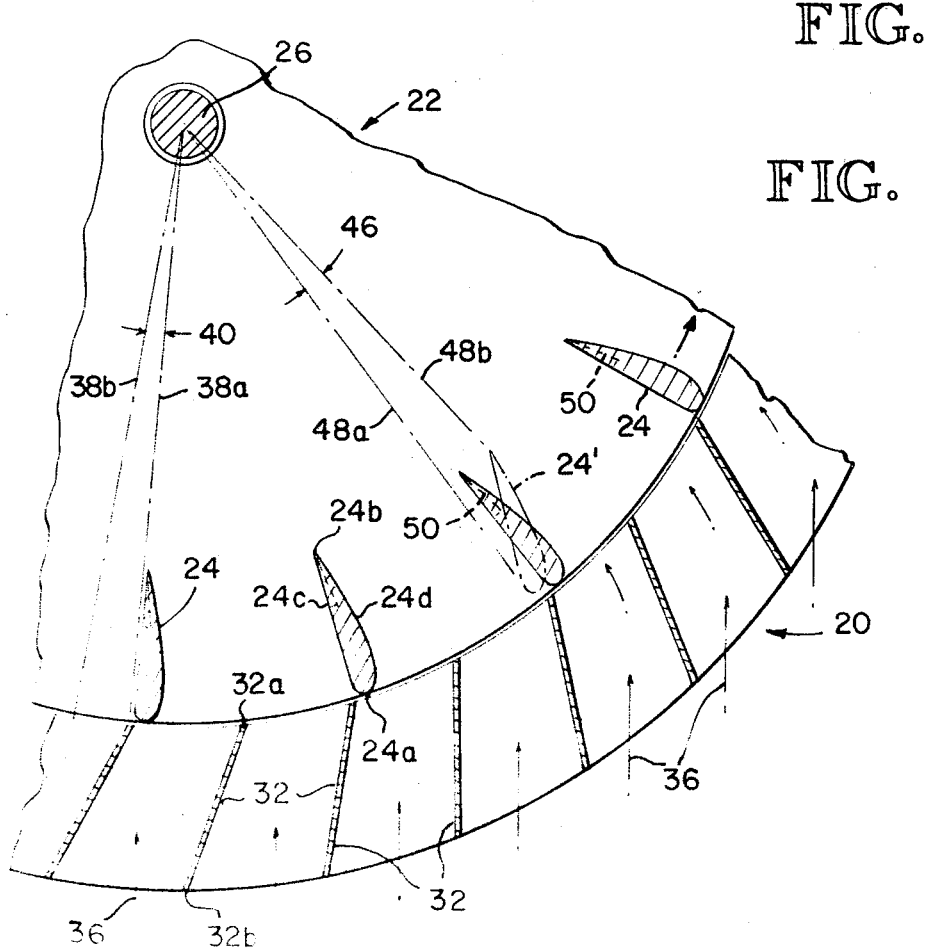
FIG. 3 is a fragmentary horizontal sectional view of the panemone to an enlarged scale.

The rotor vanes 24 may be radial as shown in FIG. 3 or adjusted as shown in phantom 24' so that the nose 24a of the rotor vanes trails the tail 24b thereof to give a positive angle of attack 46 between the respective radii 48a, 48b. This angle may be varied from positive to negative for various airfoil sections, rotor diameters, guide vane configurations and lead angles, etc.

To minimize air turbulence it is important that the noses 24a of the rotor vanes have minimum clearance with the inner edges 32a of the guide vanes. It has also been discovered that for some applications of the invention air turbulence within the rotor is reduced by providing the trailing side 24c of each rotor vane 24 with a flap 50 hinged at 52 at the tail 24b of the rotor vane and arranged to swing forwardly from a closed position flush with the trailing side 24c to an open position offset toward the leading side 24d of the rotor vane. The flaps 50 each swing open responsive to build up of the rotational velocity of the rotor 12 due to centrifugal action on a respective counterweight 54 arranged to move outward by centrifugal force in opposition to a leaf spring 56.

The counterweight 54 is mounted at one end of a slide rod 58 which has its other end pivotally connected at 59b to a triangular link 59 and passes through a pivoted guide sleeve 62. One end of the spring 56 is fixed to the wall 24d and the other end is free to slide on a guide shoe 57 responsive to pressure exerted on the spring by the link 59 at pivot 59c. The link 59 is connected to the flap 50 at pivot 59a and swings as shown in phantom in FIG. 4 to bias the spring 56 when speed buildup of the rotor 12 occurs and centrifugal force causes the counterweight 54 to move as indicated in phantom. The swinging end of the flap 50 wipes along a baffle 51. It will be apparent that the geometry and spring constant can be selected to achieve the desired flap opening rate.

Figure 2:
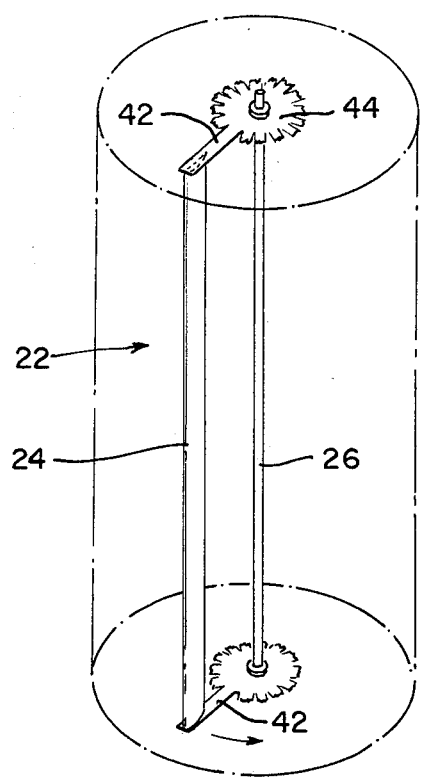
FIG. 2 is a fragmentary perspective view of the rotor.

Various cross-sectional shapes can be used for the guide vanes 32 in place of the planar configuration illustrated in FIG. 2. For example, the guide vanes can be concavo-convex 32' as shown in FIG. 5, or convex-convex 32" as indicated in FIG. 6. The guide vanes can be structural columns for large windmills and when the windmill is associated with a building. Also, the guide vanes and rotor vanes do not have to be longitudinally straight or parallel to the rotor axis. For example, in elevation both the rotor and guide vanes 124,132 can curve outwardly relative to shaft 126 (FIG. 7) or slope relative to the rotor axis (FIG. 11). as also shown by rotor and guide vanes 224,232 relative to shaft 126. These configurations of guide and rotor vanes are considered to be generally U-shaped in elevation for purposes of this description and the annexed claims.

In large windmill installations it may be helpful to be able to isolate the rotor 12 from the wind while carrying out maintenance work thereon. For this purpose the guide vanes may be pivotally mounted top and bottom by stub shafts 64 passing through suitable bearings in the end plates 28,30. Stub shafts 64 project beyond the end plate 28 and each have a respective pair of sprockets 68, 70 thereon. A drive chain 72 connects a reversible motor 74 with sprocket 68a and a chain 76 carries power from the underlying sprocket 70a to the adjoining sprocket 70b. Another chain 78 conducts power from sprocket 68b to the next sprocket 68c. In like manner alternating chains 76,78 interconnect the sprocket sets for the other guide vanes so that they will all turn in unison responsive to operation of the motor 74 in either direction of rotation. The above described system cannot only be used to rotate the guide vanes to a completely closed position, but also to adjust the vane angle. A similar system may be provided on the rotor 12 for varying the attach angle of the rotor vanes 24.

It will be apparent from the foregoing description that wind will pass between those of the guide vanes 32 exposed to the wind front and that inward narrowing of the passages between the guide vanes together with the indicated horizontal slope of the guide vanes will give the incoming air stream increased velocity and a flow pattern with a tangential thrust component in the desired direction of rotor rotation while the air flows inward across the faces of the thrust vanes 24 to simultaneously obtain an airfoil thrust reaction. With the assistance of the abrupt step in the trailing face 24c of each rotor vane 24 at the outer swinging edge of the respective flap 50 when the flaps swing open, turbulence of the air passing through is significantly reduced so that there is a relatively smooth outflow of air from the rotor downstream of the incoming wind driven air. The result is an efficient windmill which can safely and effectively operate under a great variety of wind conditions without defeating the system.

Although it is preferred for maximum efficiency to have the rotor blades 24 shaped as a high lift airfoil, it will be appreciated that the use of the guide vanes 32 in combination with a flow-through rotor having less efficient blades may still give superior results for certain windmill diameters and heights. Furthermore, in some instances the most efficient space use may be accomplished by having a drum-type rotor with radiating thrust vanes, rather than a flow-through rotor, and providing a stationary building structure within the rotor space. The upper and lower ends of the rotor and guide vane cage need not be flat but may be frustroconical, for example, to vertically converge the airstream to the guide vanes. In each of these instances the guide vanes can enhance the performance as well as being structurally significant. This is especially applicable where the guide vanes are formed in a spiral configuration and are extended radially from the rotor.

The embodiments of the invention in which a particular property or privilege is claimed are defined as follows:

1. A windmill comprising, a rotor having a vertical rotary axis mounted for rotation on an output shaft and a plurality of alike upright thrust vanes equally spaced apart circumferentially of said rotary axis, said thrust vanes each having an airfoil section with a nose, tail edge, leading face, and trailing lift face, and having its chord generally radial and its nose facing radially outward with respect to said rotary axis, whereby a rotor turning thrust is exerted on the lift face of those thrust vanes exposed to an incoming flow of air passing over the leading face and the trailing lift face thereof as a consequence primarily of the lift effect of the airfoil section, said rotor being open inwardly of the tail edge of the thrust vanes for air flow through the rotor, and a stationary guide cage surrounding said rotor having a plurality of alike upright guide vanes equally spaced apart circumferentially of said rotary axis and arranged to direct the air in a wind front between the exposed guide vanes in a predominantly radial direction with a relatively small tangential component giving a vortex effect in the rotational direction of the rotor, the inner edges of said thrust vanes being located close to the circular travel path of the nose of the thrust vanes.

2. A windmill according to claim 1 in which the trailing lift face of each thrust vane has a respective flap independent of the leading face thereof and hinged adjacent the tail edge of the vane to swing forwardly toward the leading face from a back position flush with the trailing face to a forward position stepped from the trailing face.

3. A windmill according to claim 2 in which spring means bias said flaps toward their said back position, and centrifugal force responsive means connected to said flaps for overcoming said spring means and urging said flaps toward their said forward position responsive to speed buildup of the rotor.

4. A windmill according to claim 1 in which said guide vanes are adjustable between an open air guiding position and a closed position blocking air flow to the rotor.

5. A windmill according to claim 1 in which said thrust vanes and guide vanes have respective attack angles relative to respective radii of the rotor and in which the inner edge of each of the thrust and guide vanes is offset circumferentially relative to the outer edge thereof in a common circumferential direction.

6. A windmill according to claim 1 in which the outer longitudinal edges of said guide vanes are spaced apart farther than the inner longitudinal edges thereof.

7. A windmill according to claim 1 in which said inner edges of the guide means are more advanced in the direction of rotation of said rotor than said outer edges thereof.